(12) United States Patent
Lu et al.

(10) Patent No.: US 7,669,286 B2
(45) Date of Patent: Mar. 2, 2010

(54) PIVOTAL HINGE

(75) Inventors: Sheng-Nan Lu, Shulin (TW); Chung-Yu Lee, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 1058 days.

(21) Appl. No.: 11/342,971

(22) Filed: Jan. 31, 2006

(65) Prior Publication Data
US 2007/0174996 A1  Aug. 2, 2007

(51) Int. Cl.
*E05C 17/64* (2006.01)
(52) U.S. Cl. .......................................... 16/340; 16/337
(58) Field of Classification Search ............... 16/340, 16/338, 337, 339, 342, 390, 389, 274, 289, 16/290–291; 361/680–683; 248/917–922; 455/575.1, 575.3; 348/373, 794, 333.06
See application file for complete search history.

(56) References Cited

U.S. PATENT DOCUMENTS 6,421,878 B1 * 7/2002 Kaneko et al. ................ 16/330
6,757,940 B2 * 7/2004 Lu et al. ........................ 16/330
6,779,234 B1 * 8/2004 Lu et al. ........................ 16/340
6,813,813 B2 * 11/2004 Lu et al. ........................ 16/342
6,920,670 B2 * 7/2005 Hao .............................. 16/340
7,082,642 B2 * 8/2006 Su ................................ 16/340
7,178,201 B2 * 2/2007 Lee et al. ...................... 16/342

FOREIGN PATENT DOCUMENTS

JP  2002266841 A * 9/2002
KR  2005067265 A * 7/2005

* cited by examiner

*Primary Examiner*—Chuck Y. Mah
(74) *Attorney, Agent, or Firm*—Posz Law Group, PLC

(57) ABSTRACT

A pivotal hinge has a seat and a shaft, and a first end of the shaft is inserted into the seat. A second end of the shaft is inserted into multiple washers, a first and a second positioning ring, multiple elastic rings and a cushion ring in turn. The first positioning ring can be positioned relative to the second positioning ring and with the friction force of the washers, the excellent position effect can be achieved. Hence, a cover of a laptop computer can be positioned to the chassis of the laptop computer at a desired height.

2 Claims, 6 Drawing Sheets

PIVOTAL HINGE

BACKGROUND OF THE INVENTION

1. Field of the Invention

The present invention relates to a pivotal hinge (or pivotal device), and more particularly to a pivotal hinge (or pivotal device) with which a cover of a laptop computer or a mobile phone can be raised or lowered relative to a chassis of the laptop computer or the mobile phone.

2. Description of the Related Art

A conventional pivotal device is used for a laptop computer or a mobile phone and has a shaft. A first end of the shaft is connected to a seat which is securely mounted on a chassis of a laptop computer or a mobile phone and a second end of the shaft is connected to a base which is pivoted with a cover of the laptop computer or the mobile phone. The second end of the shaft is also pivotally connected to an adjusting element and a resistance element. Multiple resetting elements and washers are respectively mounted between the adjusting element and the resistance element. The adjusting element comprises a rotating member and a positioning member. When the rotating member is rotated relative to the positioning member, the cover of a laptop computer or a mobile phone can be lowered or raised relative to the chassis of the laptop computer or the mobile phone. When the rotating member is mated with the positioning member, the cover is positioned to the chassis with the friction force of the washers and resistance element.

However, the disadvantages of the conventional pivotal device are described as follows:

1. The conventional pivotal device has a complex structure thereby resulting in a high cost and inconvenient assembly.

2. Friction between the resistance element and the washers are not enough for the cover to be reliably positioned relative to the chassis.

Therefore, the invention provides a pivotal hinge to mitigate or obviate the aforementioned problems.

SUMMARY OF THE INVENTION

The main objective of the present invention is to provide a pivotal device with which a cover of a laptop computer or a mobile phone can be reliably positioned relative to a chassis of the laptop or the mobile with lower cost and simple structure.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
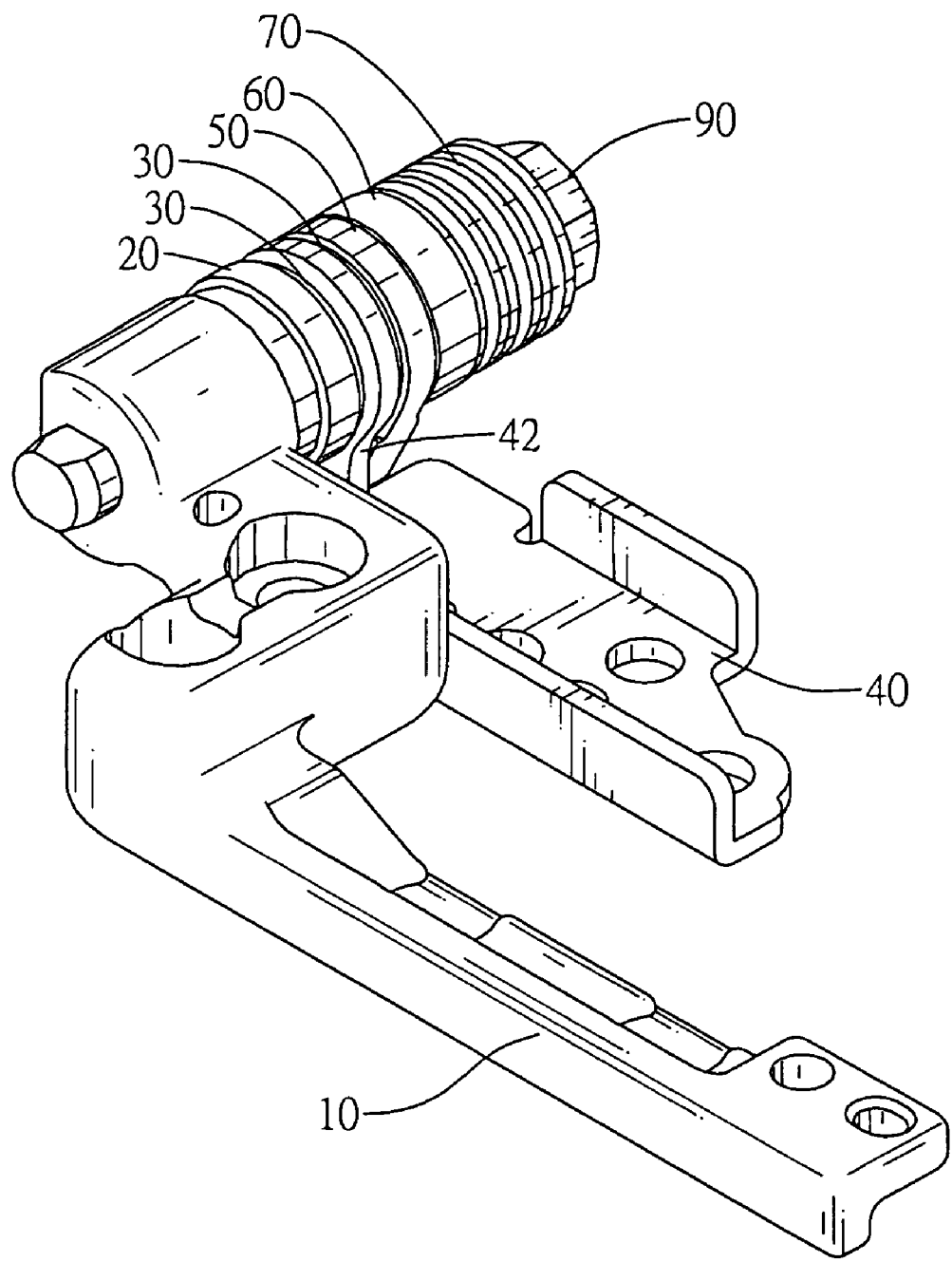
FIG. 1 is a perspective view of a pivotal hinge in accordance with the present invention.
Figure 2:
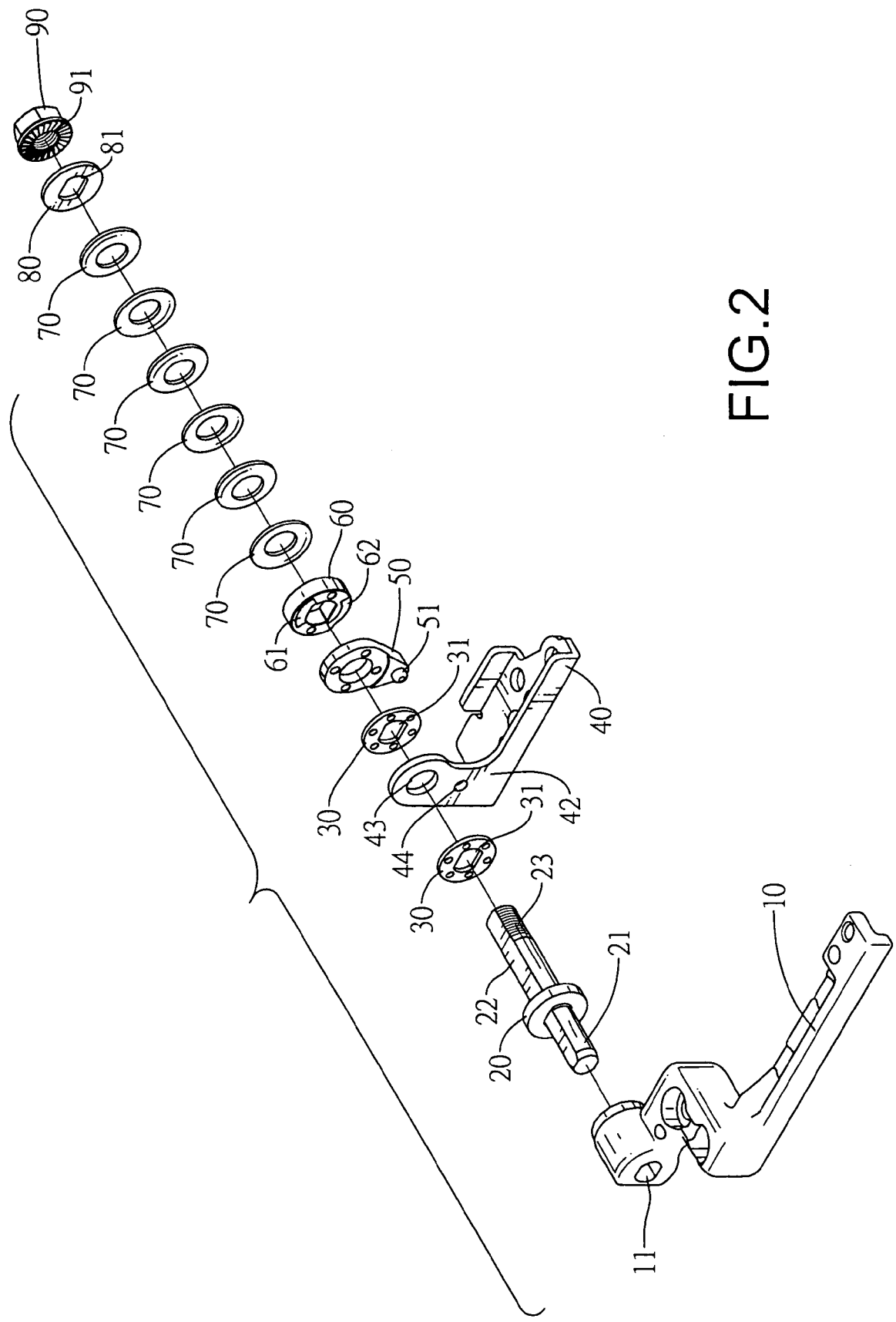
FIG. 2 is an exploded perspective view of the pivotal hinge in FIG. 1.
Figure 3:
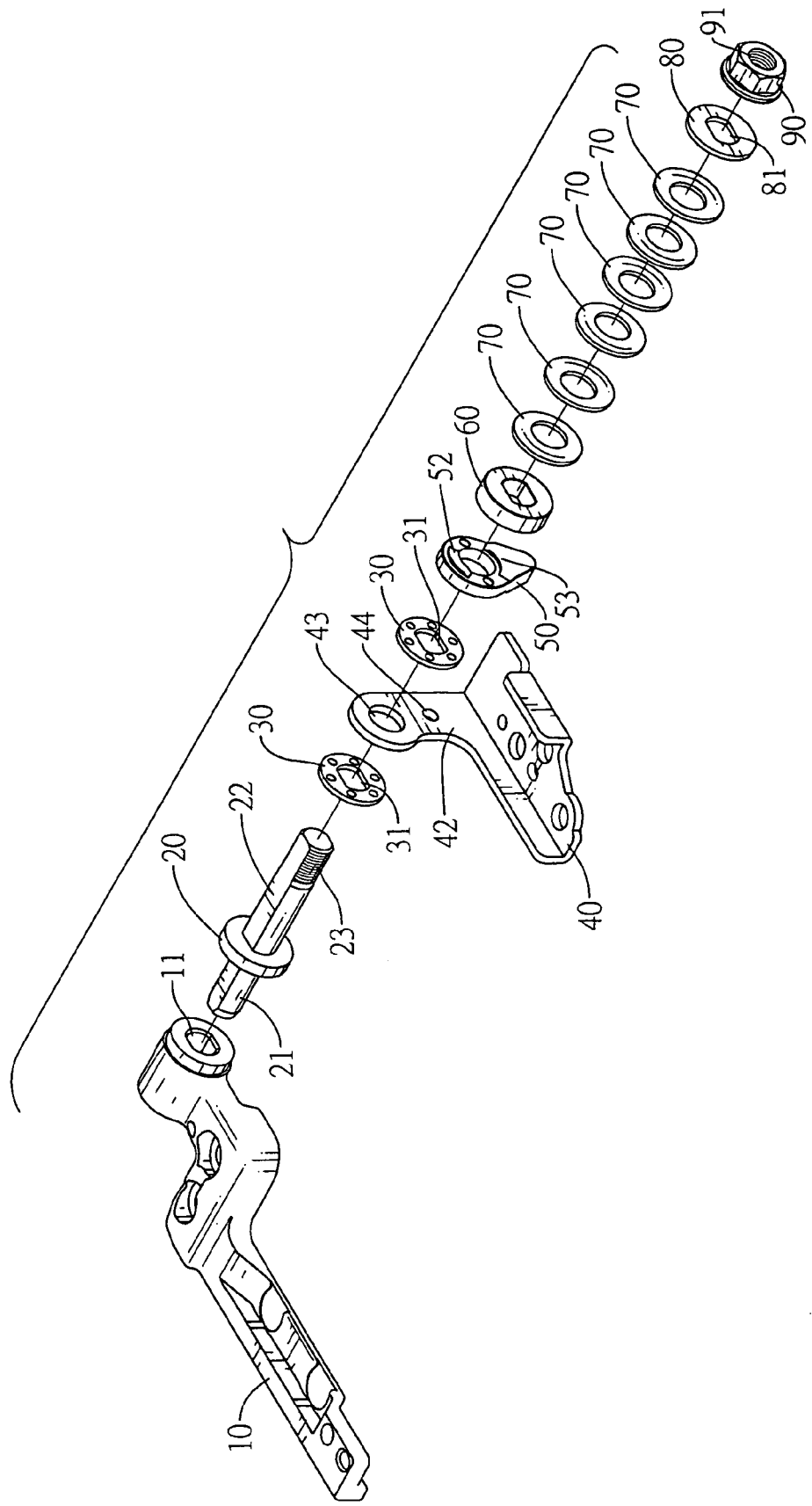
FIG. 3 is a second exploded perspective view of the pivotal hinge in FIG. 1.
Figure 4:
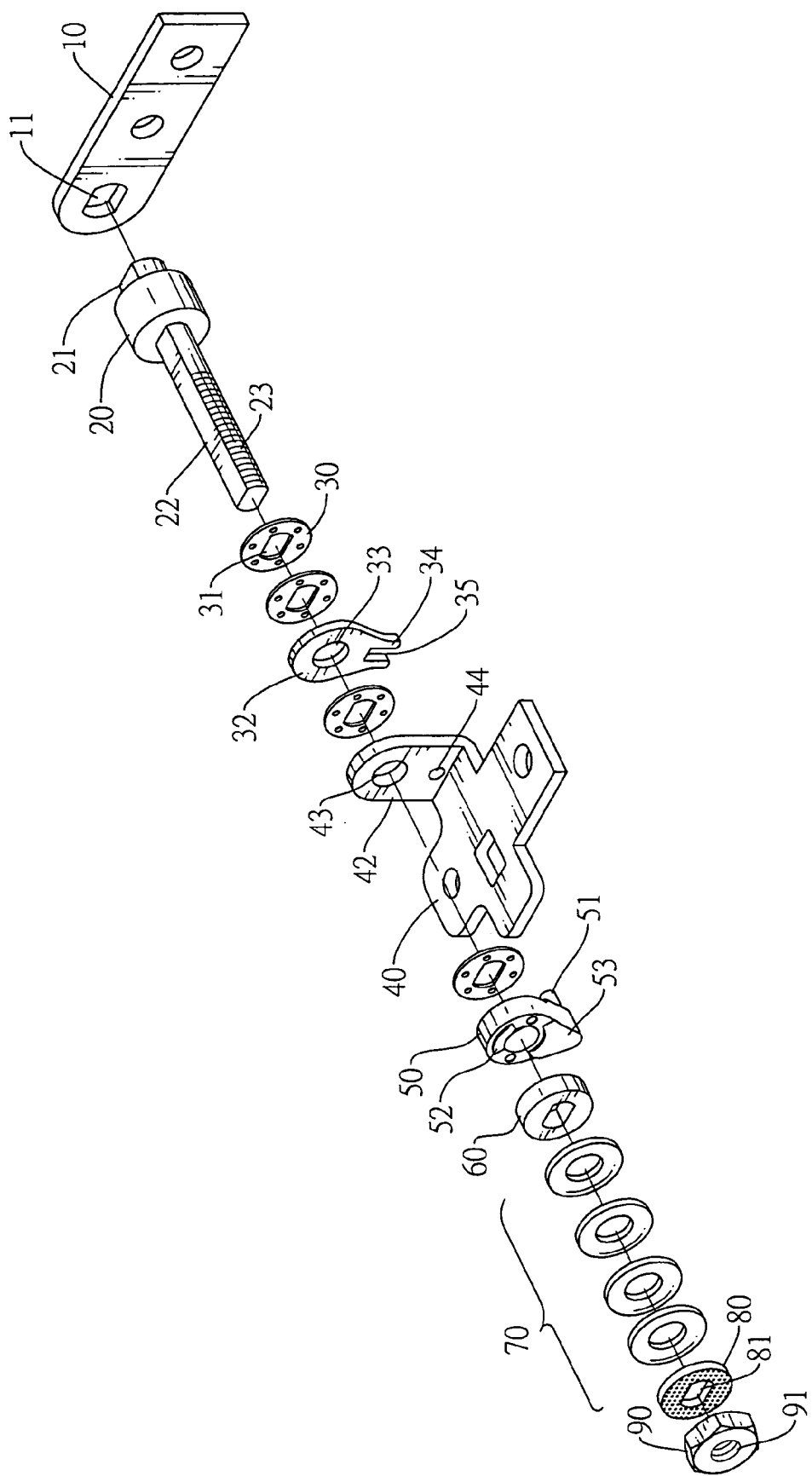
FIG. 4 is an exploded perspective view of another embodiment of the pivotal hinge in accordance with the present invention.

With reference to FIGS. 1-2 and 4, a pivotal hinge comprises a seat (10), a shaft (20), multiple washers (30), an optional positioning member (32), a base (40), a first positioning ring (50), a second positioning ring (60), multiple elastic disks (70), a cushion ring (80) and a nut (90).

The seat (10) may be a bracket or a sheet and has a noncircular hole (11) formed in an end thereof.

The shaft (20) is connected to the seat (10) and has a shank (21) with a noncircular cross section formed in a first end thereof and a post (22) with a truncated cross section formed in a second end thereof. The post (22) has two flat surfaces opposite to each other and two arcuate surfaces formed between the flat surfaces. An outer thread (23) is formed at a free end of the post (22) and opposite to the shank (21).

Each washer (30) has a noncircular opening (31) defined in a center thereof.

The positioning member (32) has a round hole (33) defined in a center thereof. A clip (34), which has two lugs in alignment, is integrally formed at and extends downward from a lower end of the positioning member (32). A gap (35) is defined between the two lugs.

The base (40) is rotatably connected to the post (22) of the shaft (20) and has a lug (42) formed on and extending upward from an end thereof. A circular hole (43) is defined near a top end of the lug (42), and a positioning hole (44) is defined near a bottom end of the lug (42) and corresponds to the circular hole (43).

The first positioning ring (50) has a circular aperture defined in a center thereof. A first arcuate cutout (52) and a second arcuate cutout (53) are respectively defined in a first side of the first positioning ring (50) and opposite to each other. A bar (51) horizontally extends from a second side of the first positioning ring (50).

The second positioning ring (60) has a noncircular aperture defined in a center thereof. A first protrusion (61) and a second protrusion (62) opposite to each other and formed in a side of the second positioning ring (60) and corresponding to the first and the second cutouts (52, 53).

Each elastic disk (70) has a circular orifice defined in a center thereof and the cushion ring (80) has a noncircular orifice (81) defined in a center thereof.

The nut (90) has an inner thread (91) formed on an inner wall thereof and mated with the outer thread (23).

Figure 5:
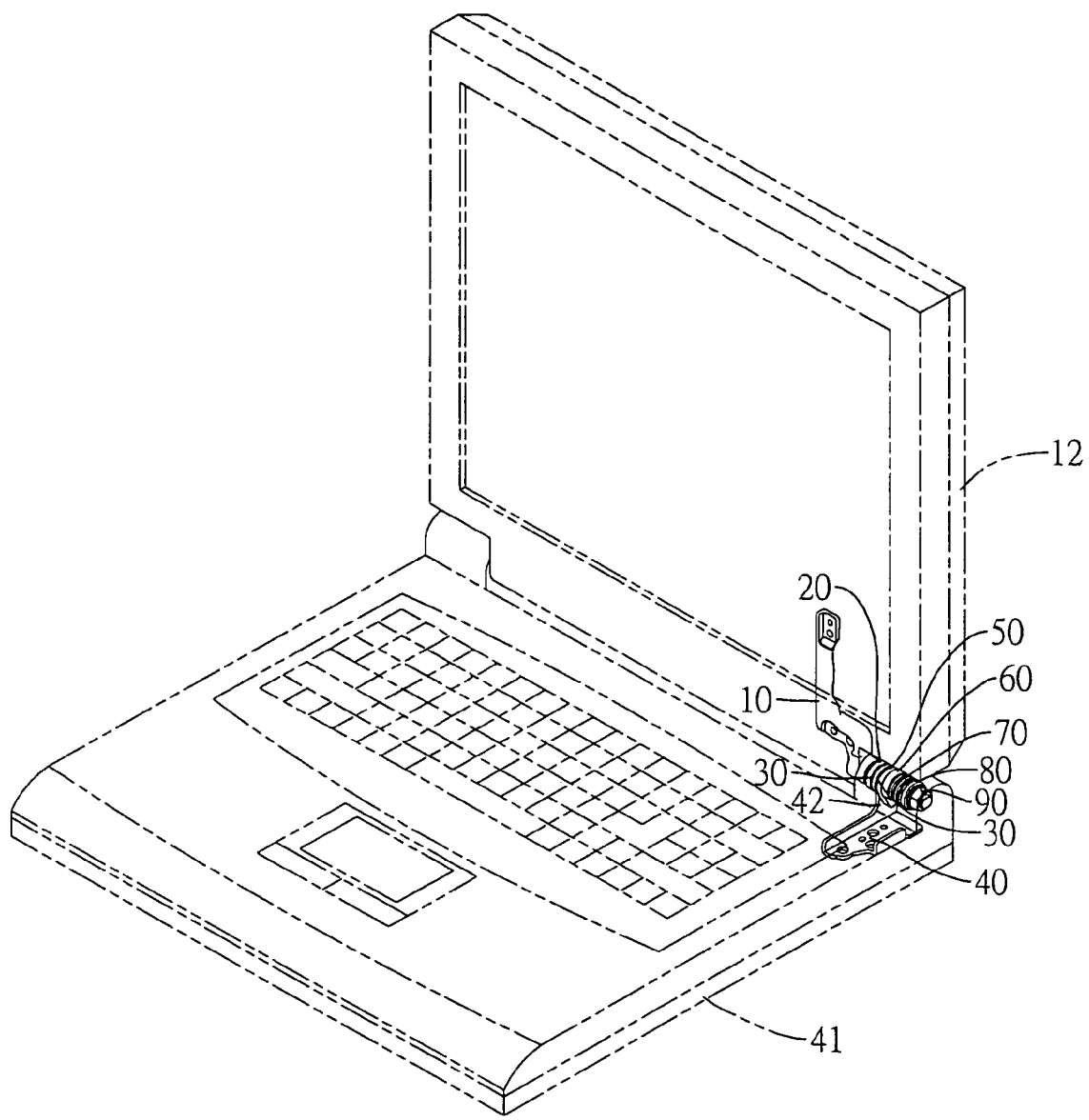
FIG. 5 is a perspective view of a laptop computer with the pivotal hinge in FIG. 1.
Figure 6:
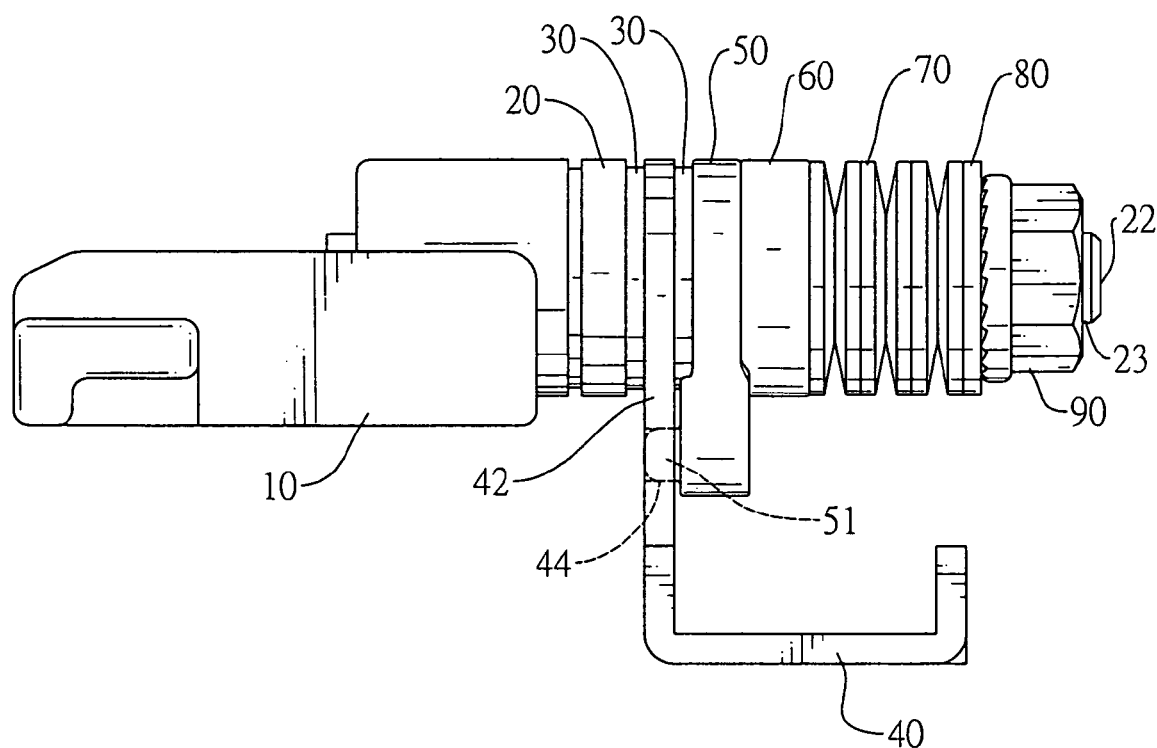
FIG. 6 is a side view of the pivotal hinge in FIG. 1.

In assembly, with further reference to FIG. 5, the seat (10) is securely mounted on a cover (12) of a laptop computer and the shank (21) is inserted into and engaged with the hole (11), so that the cover (12) is pivoted to raise or lower relative to a chassis (41) of the laptop computer by the rotation of the shank (21). The base (40) is securely mounted on the chassis (41) and between two washers (30). The post (22) is inserted into two of the washers (30), the positioning member (32), another of the washer (30), the base (40), another of the washer (30), the circular aperture of the first positioning ring (50), the noncircular aperture of the second positioning ring (60), the circular orifices of the elastic disks (70) and the noncircular orifice (81) in turn. The bar (51) is inserted into and mated with the positioning hole (44) and is securely positioned in the positioning hole (44) or is securely positioned by the clip (34). The outer thread (23) is mated with the inner thread (91) so that the nut (90) is securely mounted at a free end of the post (22). The noncircular openings (31), the noncircular aperture of the second positioning ring (60) and the noncircular orifice (81) are respectively configured to mate with the post (22) so that the washers (30), the second positioning ring (60) and the cushion ring (80) can rotate with the post (22) simultaneously.

With reference to FIGS. 2-6, when the cover (12) is pivoted relative to the chassis (41) in use, the second positioning ring (60) is rotated relative to the first positioning ring (50) so that one of the first and the second cutout (52, 53) can be mated with one of the first and the second protrusion (61, 62). Hence, with the friction force of the washers (30) and the positioning member (32), the cover (12) can be positioned on the chassis (41) at a desired height.

The advantages of the pivotal device are described as follows:

1. The washers (30) and the positioning member (32) are respectively mounted and abut the first and the second positioning ring (50, 60) to achieve a resistance force so that the cover (12) can be reliably positioned at a desired height.

2. The pivotal hinge has a simple structure thereby enabling a low cost for manufacturing and a simple assembling process.

It is to be understood, however, that even though numerous characteristics and advantages of the present invention have been set forth in the foregoing description, together with details of the structure and function of the invention, the disclosure is illustrative only. Changes may be made in details, especially in matters of shape, size, and arrangement of parts within the principles of the invention to the full extent indicated by the broad general meaning of the terms in which the appended claims are expressed.

What is claimed is:

1. A pivotal hinge comprising:
   a seat adapted to be securely mounted on a cover of a laptop computer;
   a shaft connected to the seat and having
      a shank with a noncircular cross section formed in a first end of the shank and connected to the seat, and
      a post extending from a second end of the shank and having
         two flat surfaces,
         two arcuate surfaces formed between the flat surfaces and opposite to each other, and
         an outer thread formed in a free end of the post;
      multiple washers mounted around the post and each having a noncircular opening defined in a center of the washer,
   a base rotatably connected to the post of the shaft, adapted to be securely mounted on a chassis of a laptop computer and having
      a lug longitudinally formed on and extending upward from an end of the base,
      a circular hole defined near a top end of the lug, and
      a positioning hole defined near a bottom end of the lug;
   a first positioning ring mounted around the post and having
      a circular aperture defined in a center of the first positioning ring,
      a first cutout and a second cutout respectively defined in a first side of the first positioning ring and opposite to each other, and
      a bar horizontally extending from of a second side of the first positioning ring;
   a second positioning ring mounted around the post and having a first protrusion and a second protrusion respectively defined in a side of the second positioning ring and corresponding respectively to the first and the second cutouts;
   multiple elastic disks mounted around the post and each having a circular orifice defined in a center of the elastic disk;
   a cushion ring mounted around the post and having
      a noncircular orifice defined in a center of the cushion ring; and
      a nut mounted on a free end of the post and having an inner thread formed on an inner wall of the nut and mated with the outer thread on the post; and
   a positioning member mounted around the post and having
      a round hole defined in a center of the positioning member; and
      a clip formed on and extending downward from a lower end of the positioning member,
   wherein the base is mounted between the washers, the post is inserted into the openings of the washers, the circular hole of the base, the circular aperture of the first positioning ring, the noncircular aperture of the second positioning ring, the elastic disks, the cushion ring and the nut, and the first positioning ring is securely mounted on the base, and the bar of the first positioning ring extends through the positioning hole in the lug of the base and mounted securely in the clip of the positioning member.

2. The pivotal hinge as claimed in claim 1, wherein the first and the second cutouts, the first and the second protrusions are respectively arcuate.

* * * * *